US012009139B2

(12) United States Patent
Yan et al.

(10) Patent No.: US 12,009,139 B2
(45) **Date of Patent: *Jun. 11, 2024**

(54) HIGH CURRENT SWING-TYPE INDUCTOR AND METHODS OF FABRICATION

(71) Applicant: Eaton Intelligent Power Limited, Dublin (IE)

(72) Inventors: Yipeng Yan, Shanghai (CN); Dengyan Zhou, Shanghai (CN); Jinliang Xu, Shanghai (CN); Jin Lu, Jiangsu (CN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,786

(22) Filed: Mar. 28, 2023

(65) Prior Publication Data

US 2023/0238167 A1 Jul. 27, 2023

Related U.S. Application Data

(63) Continuation of application No. 16/600,704, filed on Oct. 14, 2019, now Pat. No. 11,631,520, which is a continuation of application No. PCT/CN2017/081012, filed on Apr. 19, 2017.

(51) Int. Cl.
*H01F 27/28* (2006.01)
*H01F 27/26* (2006.01)

(52) U.S. Cl.
CPC ........... *H01F 27/263* (2013.01); *H01F 27/28* (2013.01)

(58) Field of Classification Search
CPC .... H01F 27/263; H01F 27/28; H01F 27/2847; H01F 27/306; H01F 17/04; H01F 3/14; H01F 27/292
USPC .......................... 336/221, 232, 199, 212, 178
See application file for complete search history.

(56) References Cited

U.S. PATENT DOCUMENTS

2007/0252669 A1* 11/2007 Hansen ................... H01F 17/06 336/212
2016/0276087 A1* 9/2016 Yan ........................ H01F 27/306
2019/0131050 A1* 5/2019 Danesh pajooh nejad .................. H01F 17/0033

* cited by examiner

*Primary Examiner* — Shawki S Ismail
*Assistant Examiner* — Kazi S Hossain
(74) *Attorney, Agent, or Firm* — Baker Botts L.L.P.

(57) ABSTRACT

An electromagnetic component assembly includes a first magnetic core piece, a second magnetic core piece, and an inverted U-shaped conductive winding including a base section and first and second legs extending from base section. One of the first and second magnetic core pieces is configured to receive the base section. The first and second magnetic core pieces are gapped from one another to define a first gap, and one of the first and second magnetic core pieces includes a second gap that, in combination with the first gap, allows the component to be operated at more than one stable open circuit inductance (OCL) corresponding to different current loads.

17 Claims, 13 Drawing Sheets

HIGH CURRENT SWING-TYPE INDUCTOR AND METHODS OF FABRICATION

PRIORITY

This application is a continuation application of U.S. patent application Ser. No. 16/600,704 filed 14 Oct. 2019, which is a continuation application of International Application No. PCT/CN2017/081012 filed 19 Apr. 2017, which are all hereby incorporated herein by reference in their entireties.

BACKGROUND OF THE INVENTION

The field of the invention relates generally to surface mount electromagnetic component assemblies and methods of manufacturing the same, and more specifically to surface mount, swing-type inductor components and methods of manufacturing the same.

Electromagnetic components such as inductors are known that utilize electric current and magnetic fields to provide a desired effect in an electrical circuit. Current flow through a conductor in the inductor component generates a magnetic field. The magnetic field can, in turn, be productively used to store energy in a magnetic core, release energy from the magnetic core, cancel undesirable signal components and noise in power lines and signal lines of electrical and electronic devices, or otherwise filter a signal to provide a desired output.

Swing-type inductor components, sometimes referred to as swinging chokes, are electromagnetic inductor components that may be utilized for example, in a filter circuit of a power supply that converts alternating current (AC) at a power supply input to direct current (DC) at a power supply output. Swinging chokes can also be used in filter circuitry associated with regulated, switching power supplies. Unlike other types of inductor components wherein the inductance of the component is generally fixed or constant despite the current load, the swinging choke has an inductance that varies with the current load.

More specifically, the swing-type inductor component may include a core that can be operated almost at magnetic saturation under certain current loads. The inductance of a swing core is at its maximum for a range of relatively small currents, and the inductance changes or swings to a lower value for another range of relatively higher currents. Certain challenges continue to exist in the construction and manufacture of swing-type inductor components. Improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
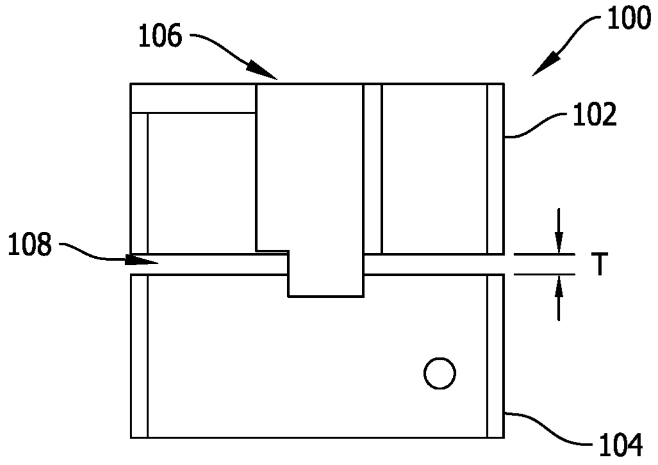
FIG. 1 is a side elevational view of a fixed inductance electromagnetic component assembly.

Exemplary embodiments of swing-type inductor components are described hereinbelow that may more capably preform in higher current, higher power circuitry than conventional inductor components now in use. The exemplary embodiments of swing-type power inductors are further manufacturable at relatively low cost and with simplified fabrication processes and techniques. Miniaturization of the exemplary embodiments of swing-type power inductors is also facilitated to provide surface mount inductor components with smaller package size, yet improved capabilities in high current applications. Method aspects will be in part apparent and in part explicitly discussed in the description below.

As mentioned above, swing-type inductor components are sometimes utilized in a filter circuit of a power supply that converts alternating current (AC) at a power supply input to direct current (DC) at a power supply output. Such converter circuitry may be commonly employed with or provided in combination with electronic devices of all kinds. In other applications, swing-type inductor components may be utilized in regulated, switching power supply circuitry of, for example, modern electronic devices of all kinds.

Recent trends to produce increasingly powerful, yet smaller electronic devices have led to numerous challenges to the electronics industry. Electronic devices such as smart phones, personal digital assistant (PDA) devices, entertainment devices, and portable computer devices, to name a few, are now widely owned and operated by a large, and growing, population of users. Such devices include an impressive, and rapidly expanding, array of features allowing such devices to interconnect with a plurality of communication networks, including but not limited to the Internet, as well as other electronic devices. Rapid information exchange using wireless communication platforms is possible using such devices, and such devices have become very convenient and popular to business and personal users alike.

For surface mount component manufacturers for circuit board applications required by such electronic devices, the challenge has been to provide increasingly miniaturized inductor components so as to minimize the area occupied on a circuit board by the inductor component (sometimes referred to as the component "footprint") and also its height measured in a direction perpendicular to a plane of the circuit board (sometimes referred to as the component "profile"). By decreasing the footprint and profile of inductor components, the size of the circuit board assemblies for electronic devices can be reduced and/or the component density on the circuit board(s) can be increased, which allows for reductions in size of the electronic device itself or increased capabilities of a device with a comparable size. Miniaturizing electronic components in a cost-effective manner has introduced a number of practical challenges to electronic component manufacturers in a highly competitive marketplace. Because of the high volume of inductor components needed for electronic devices in great demand, cost reduction in fabricating inductor components has been of great practical interest to electronic component manufacturers.

In order to meet increasing demand for electronic devices, especially hand-held devices, each generation of electronic devices needs to be not only smaller, but offer increased functional features and capabilities. As a result, the electronic devices must be increasingly powerful devices. For some types of components, such as electromagnetic inductor components that, among other things, may provide energy storage and regulation capabilities, meeting increased power demands while continuing to reduce the size of inductor components that are already quite small, has proven challenging.

As power density increases in regulated switching supply circuitry, higher operating frequency is required. Insofar as inductors are concerned, the higher operating frequency may reduce the inductance value for the same ripple current but also may increase switching loss significantly. Compared with full load operation, switching loss impacts overall efficiency more under light load as conduction loss is decreased. A lower switching frequency at lighter current load can, in turn, help reduce the switching loss but demands a higher open circuit inductance (OCL) to maintain the same current ripple as before. This is difficult to achieve, however, with conventional miniaturized inductor components. Specifically with respect to certain high power density electrical power system applications such as power supply circuits and power converters for computer servers, computer workstations and telecommunication equipment, conventional swing-type inductors have been found inadequate to perform with desired efficiency, and improvements are desired.

FIG. 1 is a side elevational view of a fixed inductance electromagnetic inductor component assembly 100 that is generally not capable of addressing the problems mentioned above. As shown in FIG. 1, the inductor 100 generally includes a first core piece 102, a second core piece 104, and a winding 106 that is configured for surface mount connection to a circuit board. As seen in FIG. 1, the winding 106 is positively engaged with both the first and second core pieces 102 and 104, and a uniform gap 108 having a constant thickness T extends between the facing surfaces of the first core piece 102 and the second core piece 104. The inductor component assembly 100 is advantageously manufacturable on a miniaturized level and can be manufactured in a relatively simple and low-cost manner in relation to conventional inductor components.

Figure 2:
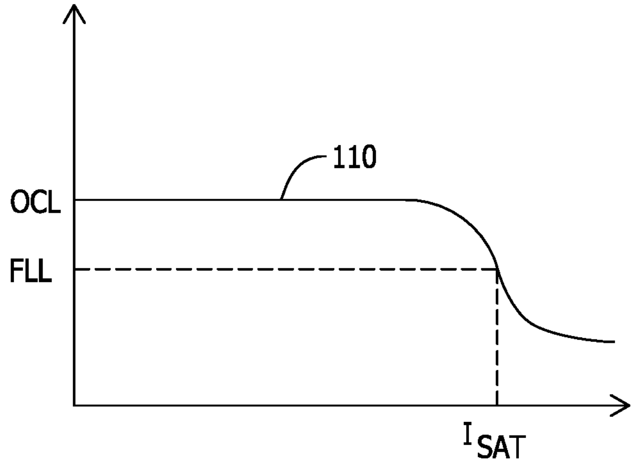
FIG. 2 is an inductance plot for the component assembly shown in FIG. 1.

FIG. 2 illustrates inductance characteristics of the inductor component assembly 100 in the form of an inductance plot wherein inductance values correspond to the vertical axis and wherein current values correspond to the horizontal axis. As seen in the inductance plot of FIG. 2, the inductor component assembly 100 exhibits a fixed and generally constant inductance value indicated in FIG. 2 by the horizontally plotted line 110 representing a constant open circuit inductance (OCL) value over a normal operating range of current values. That is, the open circuit inductance (OCL) value is the same regardless of the actual current load in use within the normal operating range of the inductor component assembly 100.

As also seen in the dashed lines in FIG. 2, when the inductor component assembly 100 is operated at a current up to its saturation current ($I_{sat}$) that represents a full load inductance (FLL) or full load operation, the inductor component assembly 100 exhibits a fixed and generally constant inductance value corresponding to a full load inductance (FLL) value regardless of the actual current load. While the inductor component assembly 100 can be operated at a lower switching frequency at a lighter current load to address switching loss in higher power density circuitry, because the OCL value of the inductor 100 is fixed the inductor component assembly 100 cannot maintain the same current ripple as when operated under a full load. This is only possible if the inductor component assembly 100 can operate at a higher OCL value, but as seen in FIG. 2 it cannot.

Exemplary embodiments of inductor component assemblies are therefore described below that are operable as swing-type inductors. That is, the embodiments described next are operable to achieve a higher OCL at light load and a lower OCL at full load, while still facilitating a miniaturized manufacture at relatively low cost. This is achieved by a combination of first and second magnetic core pieces with at least a portion of a conductive winding therebetween and with the first and second core pieces spaced from one another to define a first gap in the assembly. One of the first and second magnetic core pieces includes at least one second gap formed therein that intersects a flux line of the magnetic component assembly in use at a location separate from the first gap. The combination of the first gap and the at least one second gap results in more than one stable OCL value at different current loads. Different formations of gaps, as well as different combinations of gap filler materials, may be provided to improve operating efficiency of inductor component assemblies at various different loads while maintaining a substantially constant ripple current.

Figure 3:
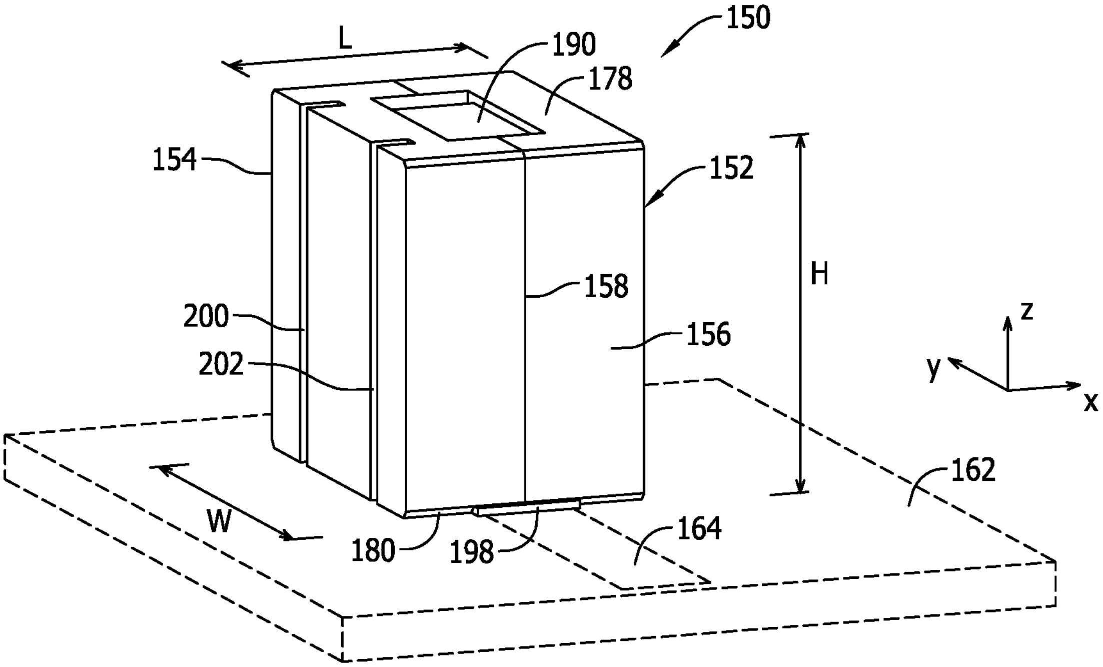
FIG. 3 is a side perspective view of a swing-type electromagnetic component assembly formed in accordance with a first exemplary embodiment of the present invention.
Figure 4:
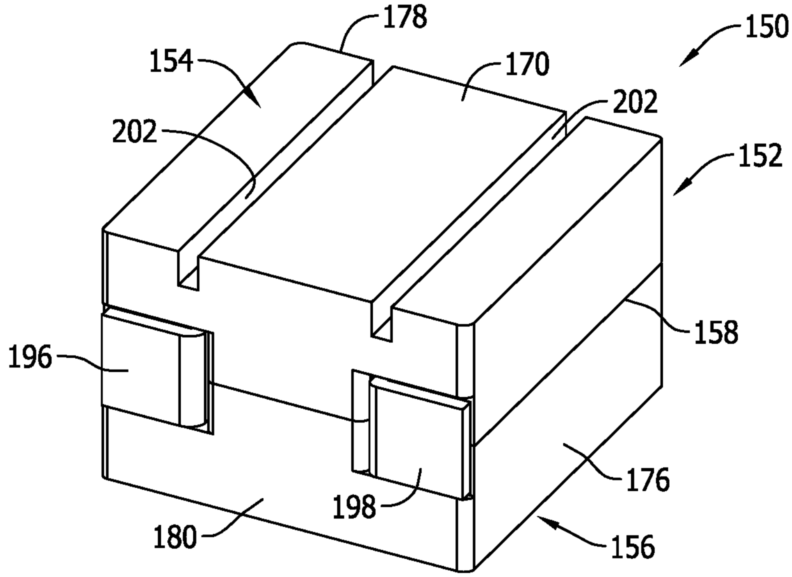
FIG. 4 is a bottom perspective view of the swing-type electromagnetic component assembly shown in FIG. 3.
Figure 5:
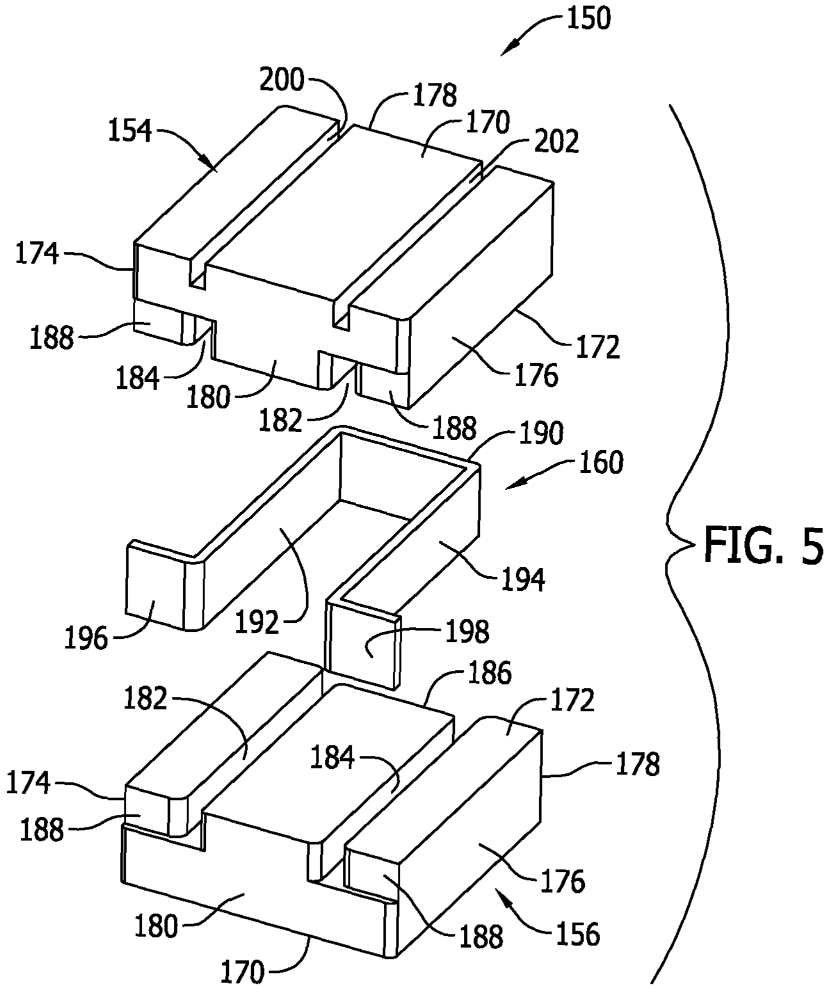
FIG. 5 is an exploded view of the swing-type electromagnetic component assembly shown in FIG. 3.
Figure 6:
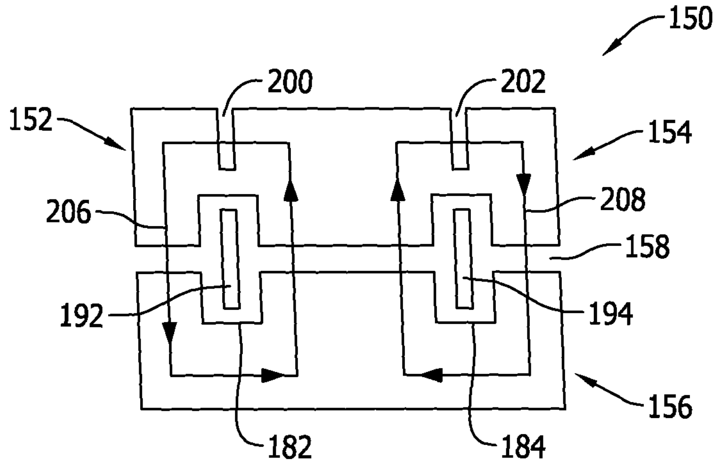
FIG. 6 is a cross-sectional of the swing-type electromagnetic component assembly shown in FIG. 3.

FIGS. 3-6 illustrate various views of a first exemplary embodiment of a swing-type electromagnetic component assembly 150 formed in accordance with a first exemplary embodiment of the present invention. Specifically, FIG. 3 is a side perspective view of the component assembly 150; FIG. 4 is a bottom perspective view of the component assembly 150; FIG. 5 is an exploded view of the component assembly 150; and FIG. 6 is a cross-sectional of the component assembly 150.

The electromagnetic component assembly 150 generally includes, as shown in the Figures a magnetic core 152 assembled from and including a first magnetic core piece 154 and a second magnetic core piece 156 that are spaced from one another to define a first gap 158 in the magnetic core 152. A conductive winding 160 is arranged between the core pieces 154 and 156.

The swing-type electromagnetic component assembly 150 is particularly suited for use in filter circuitry of a regulated power switching supply or power converter circuitry as described above. In either case, the filter circuitry and regulated power switching supply and/or power converter circuitry are implemented on a circuit board 162 (shown in phantom in FIG. 3) and the component 150 may be connected to the circuit board 162 via conductive traces 164 provided on the circuit board 162 and surface mount terminations such as those described below using known processes such as soldering processes. As such filter circuits, power regulator circuits, and converter circuits are generally known and within the purview of those in the art, no further description of the circuitry is believed to be necessary.

The magnetic core 152 includes a number of generally orthogonal sides imparting an overall rectangular or box-like shape and appearance. The size and shape of the core 152 is the result of the assembly of the magnetic core pieces 154 and 156. The box-like shape of the magnetic core 152 in the illustrated example has an overall length L measured along a first dimensional axis such as an x axis of a Cartesian coordinate system, a width W measured along a second dimensional axis perpendicular to the first dimension axis such as a y axis of a Cartesian coordinate system, and a height H measured along a third dimensional axis extending perpendicular to the first and second dimensional axis such as a z axis of a Cartesian coordinate system. The gap 158 between the core pieces 154, 156 extends along the height dimension (i.e., in a direction perpendicular to the major plane of the circuit board 162).

The dimensional proportions of the magnetic core 152 runs counter to recent efforts in the art to reduce the height dimension H to produce as low-profile components as possible. In higher power, higher current circuitry, as the height dimension H is reduced per recent trends in the art, the dimension W (and perhaps L as well) tends to increase to accommodate coil windings capable of performing in higher current circuitry. As a result, and following this trend, a reduction in the height dimension H tends to increase the width W or length L and therefore increase the footprint of the component on the board 162. The assembly 100 of the present invention, however, favors an increased height dimension H (and increased component profile) in favor of a smaller footprint on the board 162. As seen in the example of FIG. 3, the dimensions L and H are both much greater than the dimension W. Component density of the circuit board 162 may accordingly be increased by virtue of the smaller footprint of the component on the circuit board 162.

The magnetic core 152 is assembled from the magnetic core pieces 154 and 156 with the conductive winding 160 in between. The magnetic core pieces 154 and 156 may each be fabricated utilizing soft magnetic particle materials and known techniques such as molding of granular magnetic particles to produce the desired shapes. Soft magnetic powder particles used to fabricate the core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, and other suitable materials known in the art. In some cases, magnetic powder particles may be coated with an insulating material such the core pieces may possess so-called distributed gap properties familiar to those in the art and fabricated in a known manner. The core pieces 154, 156 may be fabricated from the same or different magnetic materials and as such may have the same or different magnetic properties as desired. The magnetic powder particles used to fabricate the core pieces 154, 156 may be obtained using known methods and techniques and molded into the desired shapes also using known techniques.

As best shown in the exploded view of FIG. 5, the magnetic core pieces 154 and 156 are similarly shaped but inverted relative to one another in a mirror-image arrangement on either side of the conductive winding 160.

In the example shown, each magnetic core piece 154 and 156 is formed with opposing first and second longitudinal side walls 170 and 172, opposing first and second lateral side walls 174 and 176 interconnecting the first and second longitudinal side walls 170 and 172, and opposing top and bottom walls 178 and 180 interconnecting the respective first and second longitudinal side walls 170 and 172 and the respective first and second lateral side walls 174 and 176. In the context of the present description, the "bottom" wall 180 in each piece 154 and 156 is located adjacent the circuit board 162 (FIG. 3) and the "top" wall 178 is located at some distance from the circuit board 162. Each piece 154, 156 has a generally rectangular configuration including a generally planar top surface and a generally planar opposing bottom surface opposing the top surface and extending in the x, y plane of FIG. 1 and parallel to the major surface of the circuit board 162.

In the example magnetic core pieces 154, 156 shown, the facing walls 172 are each shaped and contoured to receive portions of the conductive winding 160 as described below. Moreover, and in the example shown, each of the bottom wall 180 and the top wall 178 is shaped and contoured to receive a portion of the conductive winding 160.

More specifically, the wall 172 in each piece includes spaced-apart vertical slots 182, 184 extending in a direction generally parallel to the side walls 174, 176 and perpendicular to the top wall 178 and the bottom wall 180 for a distance sufficient to receive the corresponding vertical portions of the conductive winding 160.

The top wall 178 in each magnetic core piece 154, 156 defines a recessed surface 186 extending to the ends of the slots 182, 184. The recessed surface 186 is inset and depressed from the surface of the top wall 178 such that where the recessed surface 186 resides it has a reduced height dimension H relative to the remainder of the top wall 178. The inset recessed surface 186 is spaced from each of the side walls 174, 176. The surface 186 is recessed from, but extends generally parallel to the top wall 178 to accommodate a portion of the coil winding 160 as explained below.

The bottom wall 180 in each magnetic core piece 154, 156 further includes a pair of recessed surfaces 188 that respectively extend to the lateral sides 174, 176 and to the slots 182, 184 therein.

The winding 160 is fabricated from a thin strip of conductive material that is bent or otherwise shaped or formed into the geometry shown. In the illustrated example, the winding 160 includes a planar winding section 190 exposed on the top side 178 of each core piece 154, 156 and first and second planar legs 192, 194 each extending perpendicular to the planar winding section 190 and opposing one another. As such, and in the illustrated example, the winding 160 in the example shown is generally an inverted U-shaped member with the section 190 being the base of the U and the legs 192, 194 extending downward from the base section 190.

In the illustrated embodiment, the legs 192, 194 are disproportionately longer than the section 190 along an axis of the winding. That is, the legs 192, 194 have a first axial length (extending in a direction parallel to the height dimension H of the component 150) that is much larger than the axial length of the winding section 190 (extending in a direction parallel to the width dimension W of the component 150). For example, the axial length of the legs 192, 194 may be about three times the axial length of the section 190, although this is not strictly necessary in all embodiments. The proportions of the winding 160 facilitate a reduced footprint of the completed inductor component on the circuit board 162 as explained above, and the increased height of the winding 160 provides a winding of sufficient length to capably handle higher current in a higher power density circuit on the circuit board 162.

In the example shown, the ends of the legs 192, 194 in the winding 160 are further formed to include surface mount termination pads 196, 198. The surface mount termination pads 196, 198 extend perpendicularly to the plane of the legs 192, 194, extend generally coplanar to one another, and extend parallel to but in a plane offset from the winding section 190. Further, the surface mount termination pads 196, 198 extend in opposite directions from one another.

As seen in FIG. 3, each surface mount termination pad 196, 198 is exposed on the bottom side 180 of each core piece 154, 156 in a slightly recessed manner. The surface mount termination pads 196, 198 provide a larger area for surface mounting to the circuit board 162 and therefore capably accommodate higher power circuitry. Specifically, the surface mount termination pads 196, 198 are relatively large in the x, y plane to capably handle higher current, higher power applications beyond the limits of conventional electromagnetic component constructions of an otherwise similar size.

The U-shaped winding 160 including the surface mount termination pads is rather simply shaped and may be fabricated at low cost from a conductive sheet of material having a desired thickness into the three-dimensional shape as shown. The winding 160 may be fabricated in advance as a separate element for assembly with the core pieces 154 and 156. That is, the winding 160 may be pre-formed in the shape as shown for later assembly with the core pieces 154 and 156. The U-shaped winding 160 defines less than one complete turn in the magnetic core 152 and is less complicated and more easily assembled than larger and more complex multi-turn coils.

To assemble the component 150, the winding 160 is assembled to the first and second core pieces 154, 156 by inserting the legs 192, 194 of the winding into the respective slots 182, 184 wall in the facing walls 172 in each core piece 154, 156. The winding section 190 is received over the recessed surface 186 in the top wall 178 in each core piece 154 and 156, and the surface mount termination pads 196, 198 are received in the recessed surfaces 188 on the bottom wall 180 in each core piece 154, 156.

Each core piece 154, 156 in the exemplary component 150 receives one half of the winding 160 as shown in FIGS. 3 through 6. With the winding 160 captured in place between the core pieces 154 and 156, the core pieces 154, 156 may be bonded in place with the gap 158 extending between the facing walls 172 of the core pieces 154 and 156. When assembled, the surface mount termination pads 196, 198 extend to, but not beyond, the side walls 174, 176 on the bottom side wall 180 of each core piece 154 and 156. The footprint of the component 150 on the circuit board 162, as well as the profile of the component 150 in the height dimension H, is therefore unaffected by the presence of the termination pads 196, 198.

The core piece 154 in the example shown further includes a pair of spaced apart physical gaps 200, 202 formed in the wall 170. As shown in cross section in FIG. 6, in operation of the component 150 flux lines 206, 208 are generated inside the core 152 of the component 150. The flux lines 206, 208 extend in opposite directions as the current flow through the winding legs 192, 194 occurs in opposite directions. Each flux line 206, 208 intersects the gap 158 between the core pieces 154, 156 as shown. Importantly, the flux lines 206, 208 also respectively intersect the gaps 200, 202 in the core piece 154. The first gap 158 between the pieces, in combination with the second gaps defined by the gaps 200, 202 produces swing-type inductor functionality capable of performing at more than OCL value depending on the current load.

In the example illustrated the gaps 200, 202 in the core piece 154 extend generally parallel to one another and extend for the entire distance between the top wall 172 and the bottom wall 180 of the core piece 154. The gaps 200, 202 are further seen to generally align with the slots 182, 184 in the wall 170 of the core piece 154. Further, in the example illustrated, the gaps 200, 202 do not communicate with the gap 158 between the core pieces 154, 156. That is, the gaps 200, 202 and the gap 158 are not in fluid communication with one another, but are instead separated by a portion of the magnetic material in the core piece 154. The gaps 200, 202 have a fixed and constant size and cross-sectional area and are relatively easily formed in the core piece 154, and gap 158 between the core pieces 154, 156 is also of a fixed and constant size or dimension simplifying assembly of the component 150. Relative to some types of components having adjustable gaps to vary the inductance of the component, the component 150 may be more simply fabricated and assembled.

Figure 7:
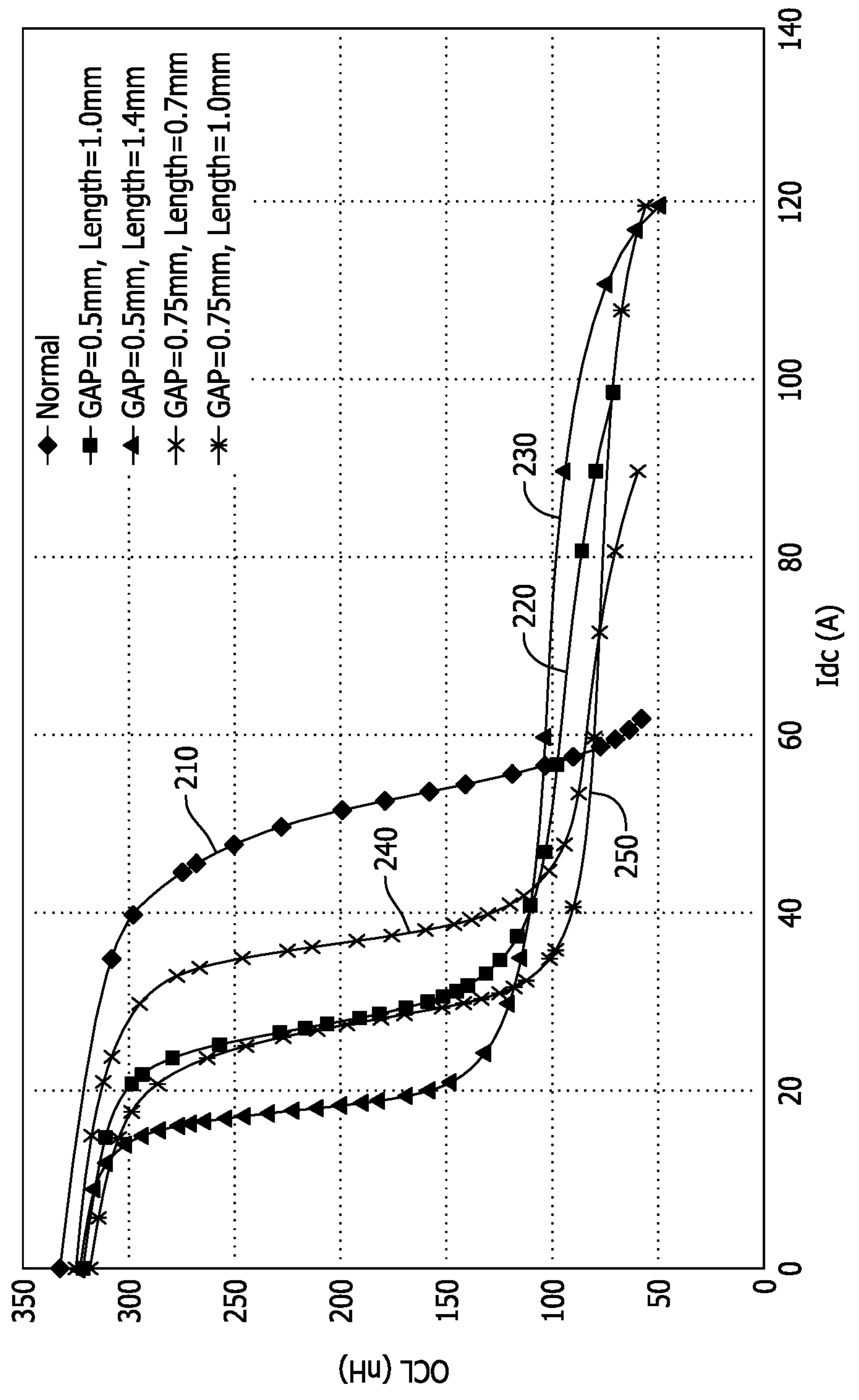
FIG. 7 illustrates an exemplary inductance versus current plot for the swing-type electromagnetic component assembly shown in FIG. 3.

FIG. 7 illustrates a series of exemplary inductance versus current plot for different variations of the component assembly 150 shown in FIGS. 3-6. OCL values are plotted along the vertical axis and current values are plotted along the horizontal axis.

A first plot 210 illustrates the performance of the component 150 that does not include the second gaps 200, 202. As seen from plot 210 the component exhibits a first OCL value at low current values but then rapidly falls without obtaining a second OCL value in another current range. The component without the second gaps 200, 202 behaves like a fixed current inductor that is problematic for the reasons explained above in relation to FIG. 2 for certain applications.

Plot 220 shows the component 150 including second gaps 200, 202 of a first size (e.g., 0.5 mm wide and 1.0 mm long). It is seen in plot 220 that the component now exhibits a first OCL value in a first, lower current range and a second OCL value in a second, higher current range. As such, the component exhibits swing-type inductor functionality that may be advantageously used in the filter circuitry of a switching regulator or power converter application described above. The component 150 can be operated at lower switching frequencies and lower current loads while maintaining the same ripple current as when operated under full load.

Plot 230 shows the component 150 including second gaps 200, 202 of a second size (e.g., 0.5 mm wide and 1.4 mm long). It is seen in plot 230 that the component still exhibits a first OCL value in a first, lower current range and a second OCL value in a second, higher current range, but different from the plot 220. The component still exhibits swing-type inductor functionality for use in the filter circuit of a switching regulator or power converter application described above, but with different current ranges and different OCL values.

Plot 240 shows the component 150 including the second gaps 200, 202 of a third size (e.g., 0.75 mm wide and 0.7 mm long). It is seen in plot 240 that the component still exhibits a first OCL value in a first, lower current range and a second OCL value in a second, higher current range, but different from the plot 230. The component still exhibits swing-type inductor functionality for use in the filter circuit of a switching regulator or power converter application described above, but with different current ranges and different OCL values.

Plot 250 shows the component 150 including second gaps 200, 202 of a fourth size (e.g., 0.75 mm wide and 1.0 mm long). It is seen in plot 250 that the component still exhibits a first OCL value in a lower current range and a second OCL value in a second current range, but different from the plot 240. The component still exhibits swing-type inductor functionality for use in the filter circuit of a switching regulator or power converter application described above, but with different current ranges and different OCL values.

It should now be evident that by varying the width and length of the second gaps 200, 202 in the core piece 154 different OCL values and different current ranges are possible to provide swing-type inductor functionality having different performance parameters and attributes.

Figure 8:
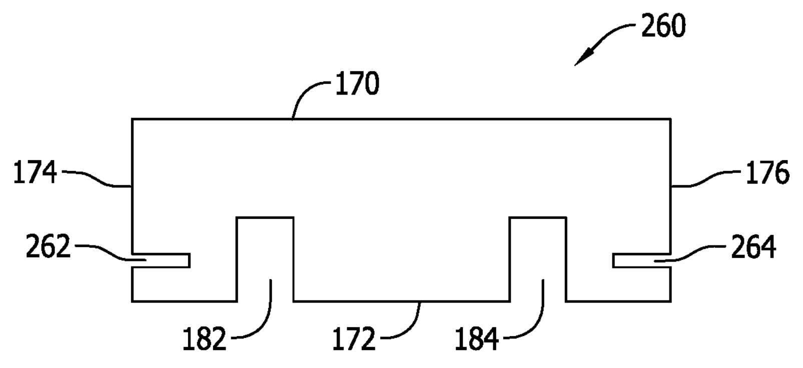
FIG. 8 is a side elevational view of an alternative magnetic core piece for the swing-type electromagnetic component assembly shown in FIG. 3.
Figure 9:
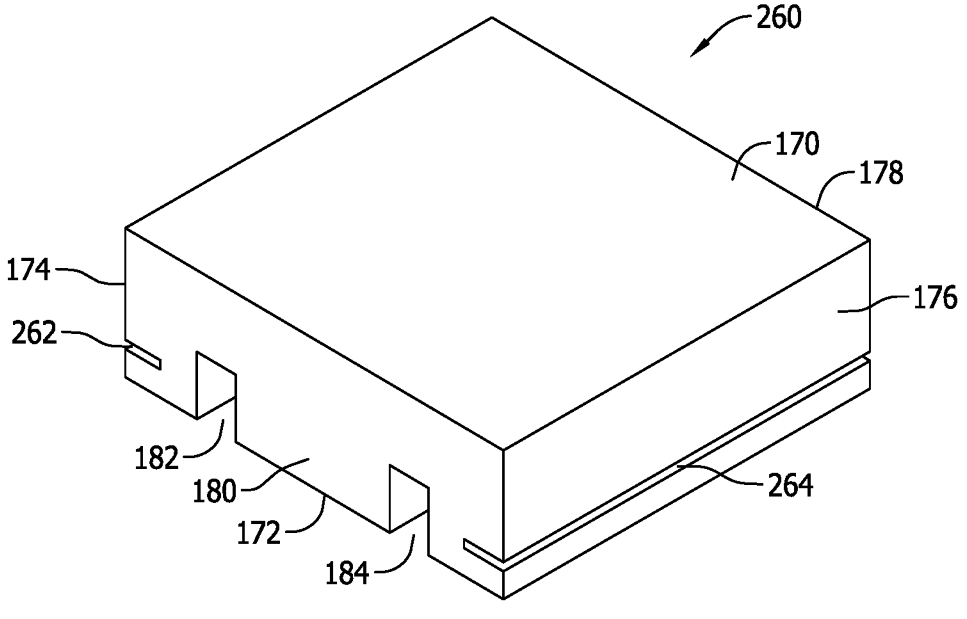
FIG. 9 is perspective view of the magnetic core piece shown in FIG. 8.

FIGS. 8 and 9 are a side elevational view and perspective view, respectively of an alternative core piece 260 for the swing-type electromagnetic component assembly 150 shown in FIGS. 3-6. The core piece 260 may be used in lieu of the core piece 154 described above with similar benefits.

The core piece 260 is similar to the core piece 154 described above in most aspects, but instead of the gaps 200, 202 being formed in the same wall 170 as in the core piece 154, the core piece 260 includes physical gaps 262, 264 formed in different ones of the respective side walls 174 and 176. When the core piece 260 is assembled with the winding 160 and the core piece 156, the physical gaps 262, 264 also intersect the flux lines 206, 208 (FIG. 6) in the core 152 and provide swing-type inductor functionality in a similar manner to that demonstrated in FIG. 7.

In the example illustrated, the gaps 262, 264 in the core piece 206 extend generally parallel to one another and for the entire distance between the top wall 178 and the bottom wall 180 of the core piece 260. The gaps 262, 264 are not aligned with, and instead extend generally perpendicularly to the slots 182, 184 in the wall 172 of the core piece 260. The gaps 262, 264 have a fixed and constant size, and extend generally coplanar to one another. Further, in the example illustrated, the gaps 262, 264 do not communicate with the gap 158 between the core pieces 156, 260. That is, the gaps 262, 264 and the gap 158 are not in fluid communication with one another, but are instead separated by a portion of the magnetic material in the core piece 260. By varying the size (e.g., width and length) of the gaps 262, 264, different OCL values and ranges of current may be obtained to produce results similar to the plots shown in FIG. 7.

Figure 10:
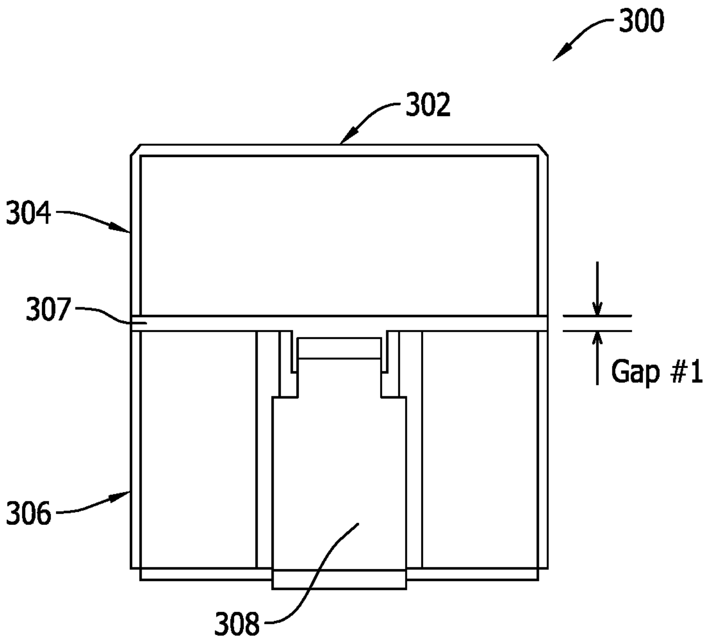
FIG. 10 is a side elevational view of a swing-type electromagnetic component assembly formed in accordance with a second exemplary embodiment of the present invention.
Figure 11:
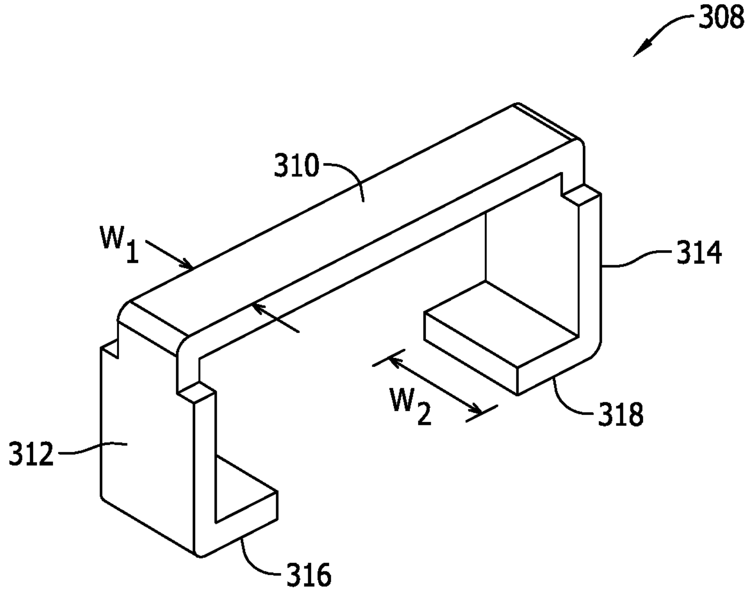
FIG. 11 is a perspective view of a conductive winding for the swing-type electromagnetic component assembly shown in FIG. 10.
Figure 12:
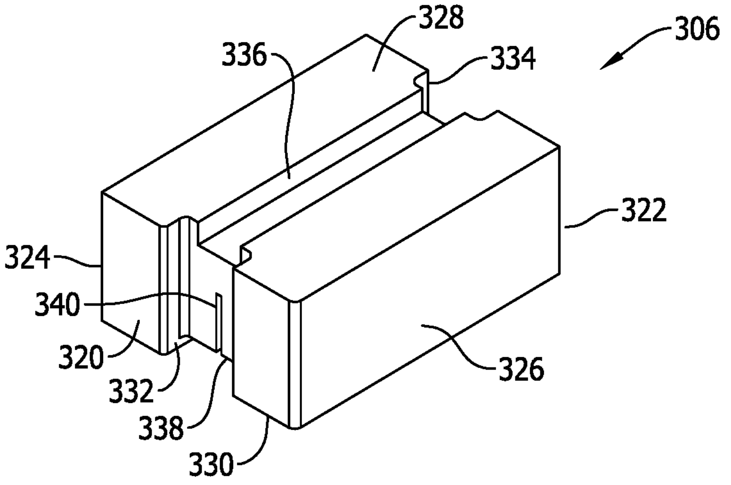
FIG. 12 is a perspective view of a first magnetic core piece for the swing-type electromagnetic component assembly shown in FIG. 10.
Figure 13:
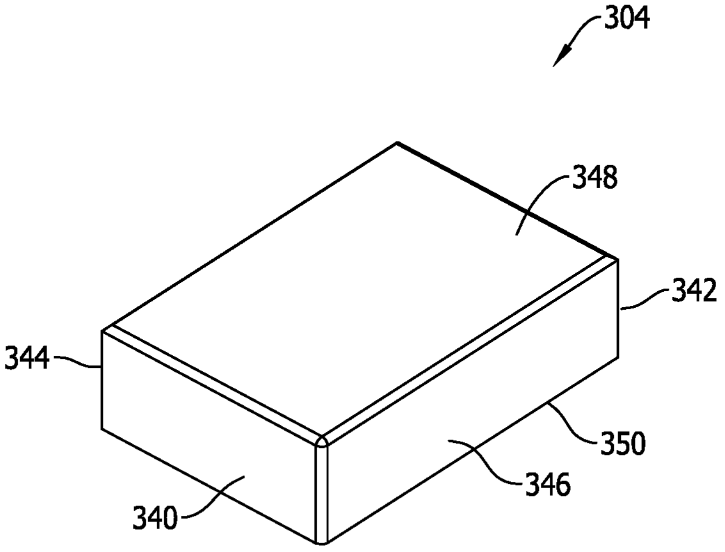
FIG. 13 is a perspective view of the second magnetic core piece for the swing-type electromagnetic component assembly shown in FIG. 10.
Figure 14:
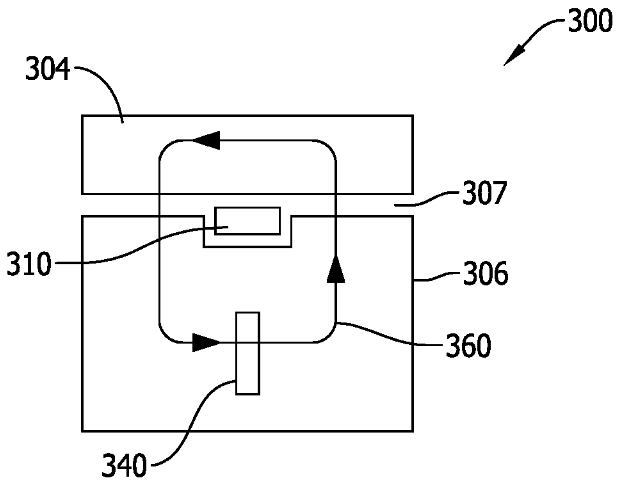
FIG. 14 is a cross-sectional view of the swing-type electromagnetic component assembly shown in FIG. 10.

FIGS. 10-14 illustrate various views of a swing-type electromagnetic component assembly 300 formed in accordance with a second exemplary embodiment of the present invention. Specifically, FIG. 10 is a side elevational view of the component assembly 300; FIG. 11 is a perspective view of a conductive winding for the component assembly 300; FIG. 12 is a perspective view of a first magnetic core piece for component assembly 300; FIG. 13 is a perspective view of a second magnetic core piece for the component assembly 300; and FIG. 14 is a cross-sectional view of the component assembly 300. The component assembly 300 may be used on the circuit board 162 (FIG. 3) in lieu of the component 150.

The electromagnetic component assembly 300 generally includes, as shown in the Figures, a magnetic core 302 including a first magnetic core piece 304 and a second magnetic core piece 306 that are gapped from one another to define a first gap 307 of a fixed and constant size. A conductive winding 308 is arranged partly between the core pieces 304 and 306.

The winding 308 is fabricated from a thin strip of conductive material that is bent or otherwise shaped or formed into the geometry shown. In the illustrated example, and as best seen in FIG. 11, the winding 308 includes a planar winding section 310 and first and second planar legs 312, 314 each extending perpendicular to the planar winding section 310 and opposing one another. As such, and in the illustrated example, the winding 308 in the example shown is generally an inverted U-shaped member with the section 310 being the base of the U and the legs 312, 314 extending downward from the base section 310.

Relative to the winding 160 described above, the legs 312, 314 are proportionately smaller than the section 310 along an axis of the winding. That is, the legs 312, 314 have a first axial length that is much smaller than the axial length of the winding section 310. For example, the axial length of the legs 312, 314 may be about one third of the axial length of the section 310, although this is not strictly necessary in all embodiments. The proportions of the winding 308 facilitate a reduction in height of the winding 310 relative to the winding 160, while still providing a winding of sufficient length to capably handle higher current in a higher power electric system on, for example, the circuit board 162.

In the example shown, the ends of the legs 312, 314 in the winding 308 are further formed to include surface mount termination pads 316, 318. The surface mount termination pads 316, 318 extend perpendicularly to the plane of the legs 312, 314, extend generally coplanar to one another, and extend parallel to but in a plane offset from the winding section 310. Further, the surface mount termination pads 316, 318 extend inwardly from the respective legs 312, 314 toward one another. This is unlike the winding 160 in which the surface mount termination pads extend outwardly and away from one another from the respective legs in opposite directions.

As also seen in FIG. 11, the winding section 310 has a reduced width dimension $w_1$ relative to the width dimension $w_2$ of the legs 312, 314 and the surface mount terminations 316, 318. The increased width $w_2$ of the conductor in the legs 312, 314 and the surface mount terminations 316, 318 provides for increased current carrying capability while the reduced width $w_1$ of the winding section 310 still provides an adequate magnetic field when current flows through the winding section 310 in the magnetic core 302. The reduced width $w_1$ of the winding section 310 is centered on the larger width $w_2$ of the legs 312, 314 such that each side edge of the winding section is recessed or inset relative to the corresponding side edges of the legs 312, 314.

The surface mount termination pads 316, 318 are exposed on the bottom side of the component 300 in a slightly recessed manner. The surface mount termination pads 316, 318 provide a larger area for surface mounting to the circuit board 162 and therefore capably accommodate higher power circuitry. Specifically, the surface mount termination pads 316, 318 are relatively large in the x, y plane to capably handle higher current, higher power applications beyond the limits of conventional electromagnetic component constructions of an otherwise similar size.

The U-shaped winding 308 including the surface mount termination pads 316, 318 is rather simply shaped and may be fabricated at low cost from a conductive sheet of material having a desired thickness into the three-dimensional shape as shown. The winding 308 may be fabricated partially in advance as a separate element for assembly with the core pieces 304 and 306. For instance, the winding 308 may be pre-formed with the section 310 and the legs 312, 314, with the surface mount terminations formed after assembly of the winding 308 with the core piece 306. The U-shaped winding 308 defines less than one complete turn in the magnetic core 302 and is less complicated and more easily assembled than larger and more complex multi-turn coils.

The core piece 306 is shown in FIG. 12 and is formed to include lateral side walls or end walls 320 and 322, longitudinal walls 324 and 326, and top and bottom walls 328 and 330 arranged to collectively a generally orthogonal, box-like shape. The core piece 306 may be formed from any of the magnetic materials mentioned above and by known techniques into the shape shown.

The lateral side walls or end walls 320 and 322 each include recesses 332, 334 having a width dimension generally the width dimension generally equal to width $w_2$ of the winding legs 312, 314 (FIG. 11). The top wall 328 includes a recess 336 having a width dimension generally equal to width $w_1$ of the winding section 310 (FIG. 11). The bottom wall 330 includes recesses 338 having a width dimension generally equal to width $w_2$ of the winding termination pads 316, 318 (FIG. 11). As such, the respective recesses in the core piece 306 generally receive the portions of the winding 308 when the winding 308 is assembled to the core piece 306. Each of the recesses is generally centered in the core piece 306 between the opposing side walls 304 and 306.

The core piece 306 further includes a physical gap 340 of a fixed and constant size that extends vertically (i.e. perpendicular to the top and bottom wall 330) for part of the vertical height of the recessed section of the core piece 306. The gap 340 extends end-to-end from the recessed section of the end wall 320 to the recessed section of the end wall 322 and is generally open to the bottom wall 330 of the core piece. The gap 340 is not in communication, however, with the recess 336 in the top wall 328. That is, the gap 340 and the recess 336 are not in fluid communication with one another, but are instead separated by a portion of the magnetic material in the core piece 306. In the embodiment shown, the gap 340 extends generally in a centered position between the side walls 324 and 326.

Figure 16:
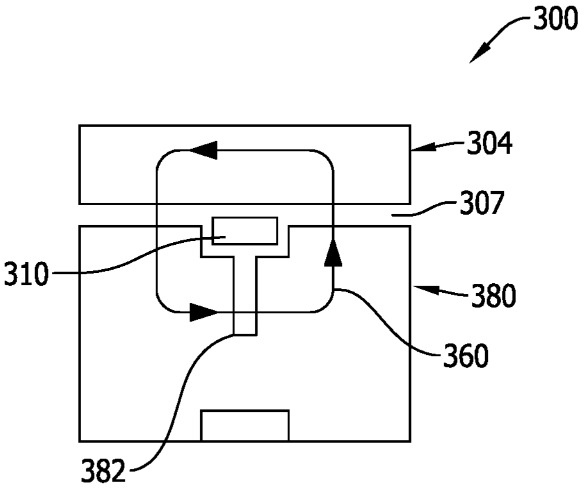
FIG. 16 is a cross-sectional view of a swing-type electromagnetic component assembly including the magnetic core piece shown in FIG. 15.

FIG. 13 shows the core piece 304, which is formed to include lateral side walls or end walls 340 and 342, longitudinal walls 344 and 346, and top and bottom walls 348 and 350 arranged to collectively a generally orthogonal, box-like shape. The core piece 304 may be formed from any of the magnetic materials mentioned above and by known techniques into the shape shown. As seen in FIG. 16, the core piece 304 does not includes any recesses, any gaps, or any openings, and instead is a generally solid piece of magnetic material in a block-like shape with flat exterior walls.

FIG. 14 illustrates the component 300 in cross section. In use, a flux line 360 is generated around the winding section 310 in the winding 308. The flux line 360 intersects the gap 307 between the facing walls 350, 328 of the core pieces 304, 306. The flux line 360 also intersects the gap 340 in the core piece 306. The combination of the first and second gaps 307, 340 produces the swing-type inductor functionality described above wherein first and second OCL values are possible in different current ranges. By varying the size and length of the second gap 340 formed in the core piece 306, swing-type inductors can be provided having different performance characteristics as demonstrated earlier in relation to FIG. 7 with similar benefits.

Figure 15:
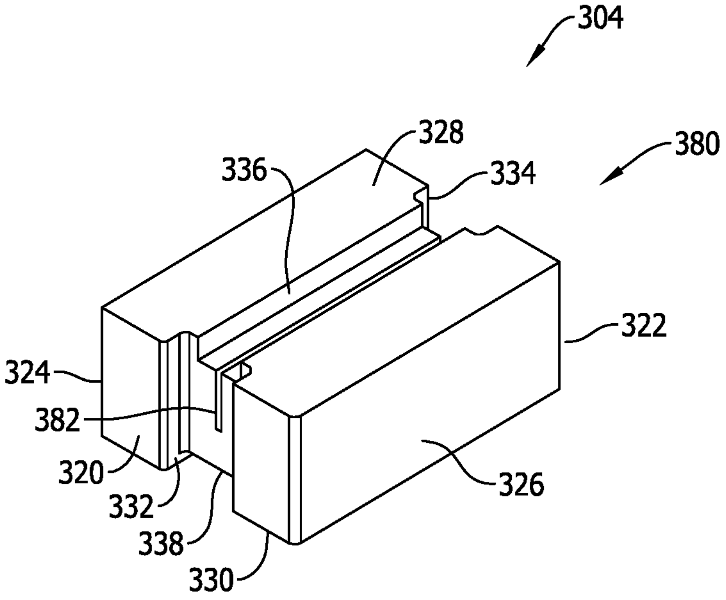
FIG. 15 is of an alternative core piece for the swing-type electromagnetic component assembly shown in FIG. 10.

FIGS. 15 and 16 respectively illustrate an alternative core piece 380 for the swing-type electromagnetic component assembly 300 shown in FIG. 12 and a cross-sectional view of a swing-type electromagnetic component assembly including the magnetic core piece 380.

The core piece 380 is similar to the core piece 306 described above, but instead of the gap 340 the core piece 380 includes a physical gap 382. The physical gap 382 extends vertically (i.e. perpendicular to the top and bottom wall 330) for part of the vertical height of the recessed section of the core piece 380. The gap 382 is fixed and constant in size, and extends end-to-end from the recessed section of the end wall 320 to the recessed section of the end wall 322 and is generally open to the top wall 328 of the core piece. The gap 382 is in fluid communication with the recess 336 in the top wall 328. In the embodiment shown, the gap 382 extends generally in a centered position between the side walls 324 and 326.

FIG. 16 illustrates the component 300 in cross section including the core piece 380. In use, the flux line 360 is generated around the winding section 310 in the winding 308. The flux line 360 intersects the gap 307 between the facing walls 350, 328 of the core pieces 304, 380. The flux line 360 also intersects the gap 382 in the core piece 380. The combination of the first and second gaps 307, 382 produces the swing-type inductor functionality described above wherein first and second OCL values are possible in different current ranges. By varying the size and length of the second gap 382, swing-type inductors can be provided having different performance characteristics with similar benefits to those described above.

Figure 17:
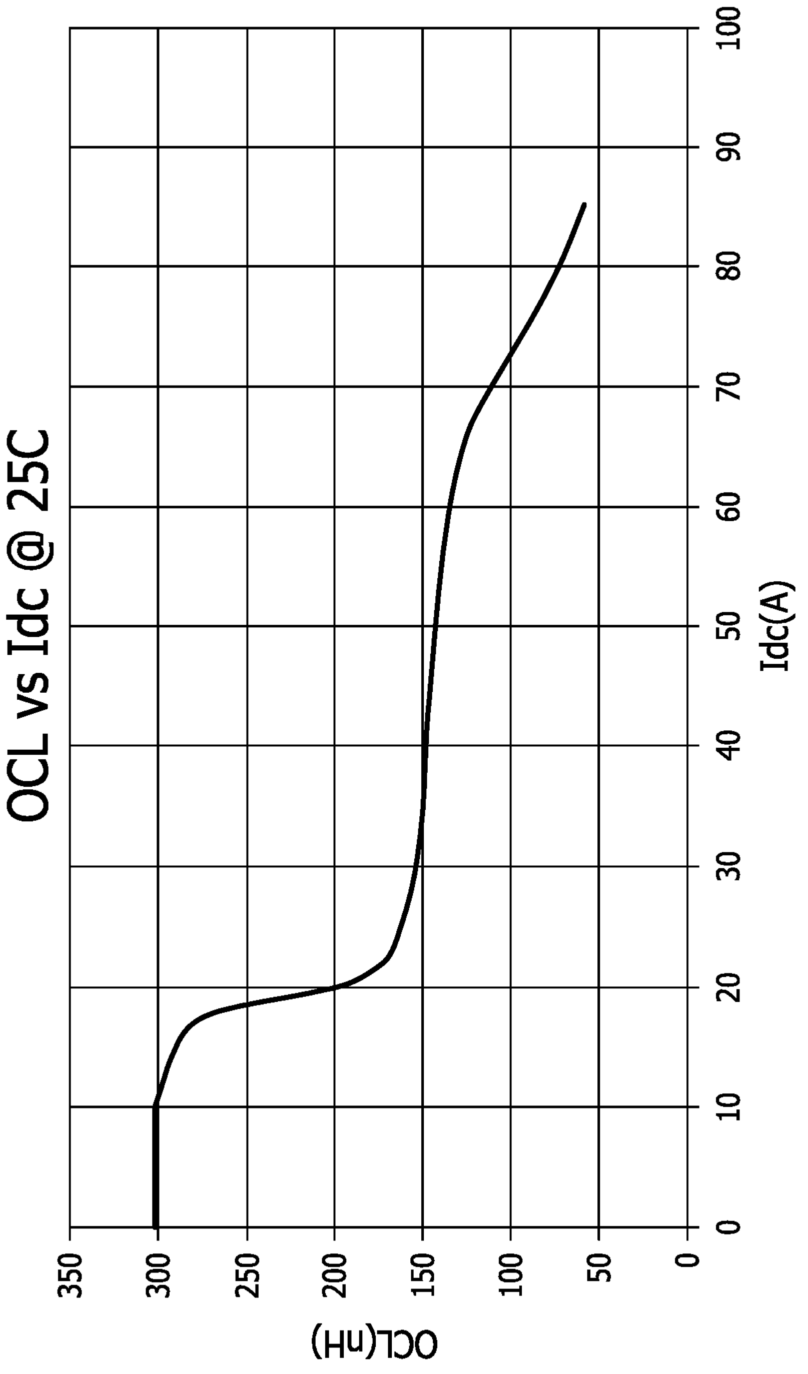
FIG. 17 illustrates an exemplary inductance versus current plot for the swing-type electromagnetic component assembly shown in FIG. 10 or 15.

FIG. 17 illustrates an exemplary inductance versus current plot for the swing-type electromagnetic component assembly 300. First and second OCL values over different current ranges are clearly seen.

Figure 18:
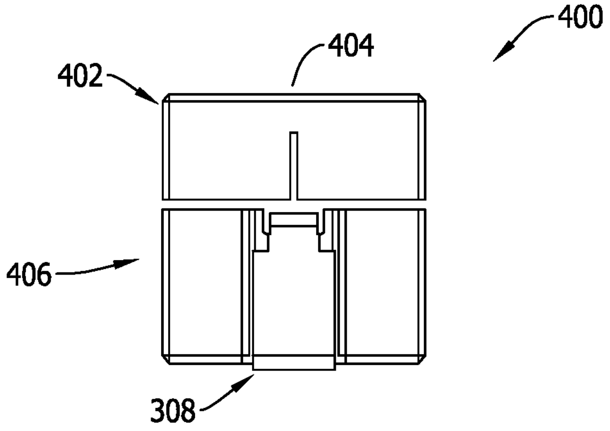
FIG. 18 is a side elevational view of a swing-type electromagnetic component assembly formed in accordance with a third exemplary embodiment of the present invention.
Figure 19:
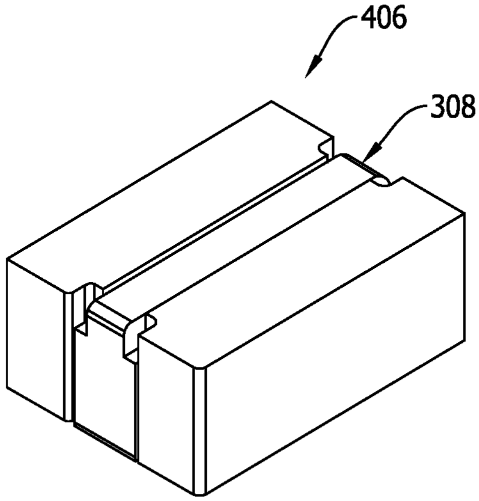
FIG. 19 is a perspective view of a first magnetic core piece and conductive winding for the swing-type electromagnetic component assembly shown in FIG. 18.
Figure 20:
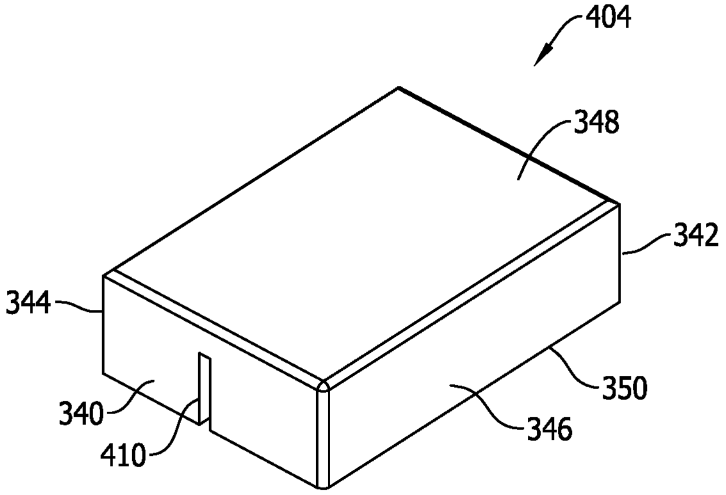
FIG. 20 is a perspective view of a second magnetic core piece for the swing-type electromagnetic component assembly shown in FIG. 18.
Figure 21:
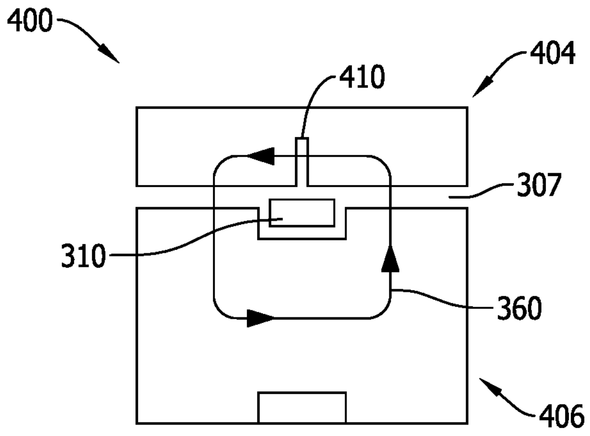
FIG. 21 is a cross-sectional view of the swing-type electromagnetic component assembly shown in FIG. 18.

FIGS. 18-21 illustrate various views of a swing-type electromagnetic component assembly 400 formed in accordance with a third exemplary embodiment of the present invention. Specifically, FIG. 18 is a side elevational view of the component assembly 400; FIG. 19 is a perspective view of a first magnetic core piece and conductive winding for component assembly 400; FIG. 20 is a perspective view of a second magnetic core piece for the component assembly 400; and FIG. 21 is a cross-sectional view of the component assembly 400.

The electromagnetic component assembly 400 generally includes, as shown in the figures, a magnetic core 402 including a first magnetic core piece 404 and a second magnetic core piece 406 that are gapped from one another to define a first gap 307. The conductive winding 308 is arranged partly between the core pieces 404 and 406.

FIG. 19 shows the conductive winding 308 assembled to the core piece 406. The core piece 406 is similar to the core piece 306 described above, but does not include the gap 340.

The core piece 404 shown in FIG. 20 is similar to the core piece 304 described above, but includes a physical gap 410 formed in the bottom wall 350. The physical gap 410 extends end to end between the walls 342, 344 and is open to the bottom wall 350. The gap 410 extends parallel to and is generally centered between the walls 344, 346.

As shown in FIG. 21, in use of the component 400 the flux line 360 intersects the gap 307 between the facing walls of the core pieces 404, 406. The flux line 360 also intersects the gap 410 in the core piece 404. The combination of the first and second gaps 307, 410 produces the swing-type inductor functionality described above wherein first and second OCL values are possible in different current ranges. By varying the size and length of the second gap 410, swing-type inductors can be provided having different performance characteristics.

Figure 22:
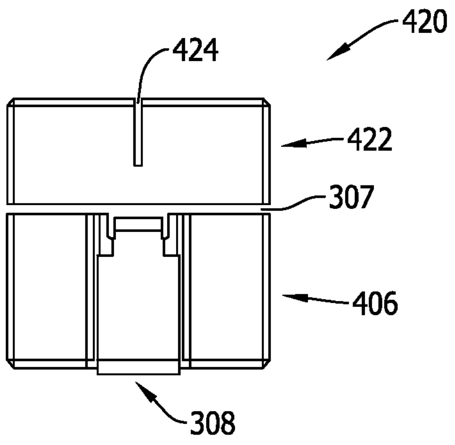
FIG. 22 is a side elevational view of a swing-type electromagnetic component assembly formed in accordance with a fourth exemplary embodiment of the present invention.
Figure 23:
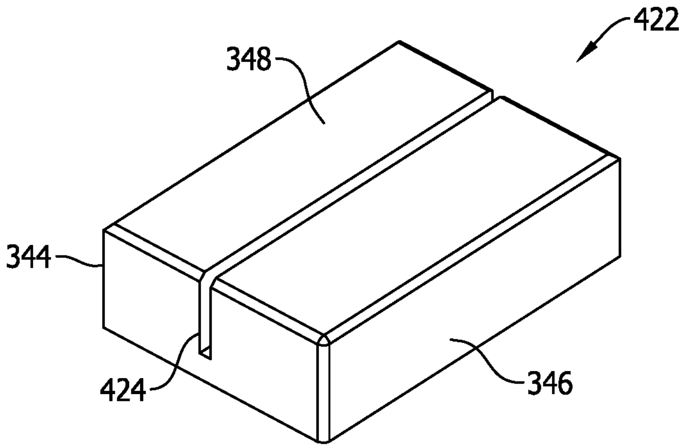
FIG. 23 is a perspective view of a second magnetic core piece and conductive winding for the swing-type electromagnetic component assembly shown in FIG. 22.

FIGS. 22 and 23 are views of a swing-type electromagnetic component assembly 420 formed in accordance with a fourth exemplary embodiment of the present invention.

As shown in FIG. 22 the swing-type electromagnetic component assembly 420 includes a magnetic core assembled from a first core piece 422 and the second magnetic core piece 406 with the winding 308 extending partly therebetween.

The core piece 422 is similar to the core piece 304 described above, but includes a physical gap 424 formed in the top wall 348. The physical gap 424 extends end to end between the walls 340, 342 and is open to the top wall 348. The gap 424 extends parallel to and is generally centered between the walls 344, 346.

Like the foregoing embodiments, in use of the component 420 the flux line 360 intersects the gap 306 between the facing walls of the core pieces 422, 406. The flux line 360 also intersects the gap 424 in the core piece 422. The combination of the first and second gaps 306, 424 produces the swing-type inductor functionality described above wherein first and second OCL values are possible in different current ranges. By varying the size and length of the second gap 424, swing-type inductors can be provided having different performance characteristics.

While various different examples have now been described including different gaps in one of the core pieces, which when combined with the gap between the core pieces, provides the swing-type inductor operation desired in particular switching regulator and power converter applications. As seen in the exemplary plots of FIG. 7 and FIG. 17, the OCL value in such components is seen to include a first sharp drop when the current exceeds a first value and a second drop when the current exceeds a second value, whereas the inductance plot shown in FIG. 2 for the inductor component assembly 100 includes a single drop. The first and second OCL drops in the components of the invention allow them to operate at a first current $I_{Sat1}$ with a corresponding full load inductance FLL1 while also facilitating operation at a second and higher current $I_{Sat2}$ with corresponding full load inductance FLL2. The full load inductance FLL2 is lower than the full load inductance FLL1.

The components of the invention are therefore operable at a lower current with a higher inductance value (e.g., FLL1), and a higher current level with a lower inductance value (e.g., FLL2). The components exhibit a first OCL level in a first operating range and a second OCL level in a second operating range, rendering it possible to maintain a constant current ripple current. Relative to the fixed inductance component shown in FIG. 1, the components are operable with enhanced performance, and specifically with swing-type inductor functionality, while still facilitating miniaturization and manufacturing benefits. The inductor assemblies of the invention can be operated efficiently at a lower switching frequency at a lighter current load to address switching loss in higher density circuitry, without affecting the ripple current.

It should be understood that while the examples described and illustrated include physical gaps, sometimes referred to as air gaps, either the first or second gaps in the components may be filled with a magnetic material exhibiting different properties from the remainder of the core pieces. As such, magnetic gaps could be created instead of non-magnetic air-gaps to provide still further performance variations, but still while obtaining swing-type inductor functionality. Inductance plots of the components such as those shown in FIGS. 7 and 17 can further be influenced by varying the magnetic properties of the core pieces and/or the magnetic properties of the first and second gaps in the assembly.

The various components described above offer a considerably variety of swing-type inductor functionality while using a small number of component parts that are manufacturable to provide small components at relatively low cost with superior performance advantages. Particularly in the case of high-power density electrical power system applications such as power supply circuits and power converters for computer servers, computer workstations and telecommunication equipment, the swing-type inductors components described herein are operable with desired efficiency generally beyond the capability of conventionally constructed surface mount swing-type inductor components.

The benefits and advantages of the inventive concepts disclosed are now believed to be evident in view of the exemplary embodiments disclosed.

An embodiment of an electromagnetic component assembly has been disclosed including: a first magnetic core piece; a second magnetic core piece extending in spaced relation from the first magnetic core piece to define a first gap; and an inverted U-shaped conductive winding including a base section and first and second legs extending from the base section; wherein at least one of the first and second magnetic core pieces is configured to receive at least a portion of the inverted U-shaped conductive winding; and wherein one of the first and second magnetic core pieces further includes a second gap that, in combination with the first gap, allows the component to be operated at more than one stable open circuit inductance (OCL) corresponding to different current loads.

Optionally, each of the first and second magnetic core pieces has a bottom surface and a top surface opposing the bottom surface, with the base section of the inverted U-shaped conductive winding being exposed on the top surface of each of the first and second magnetic core pieces. The legs of the inverted U-shaped conductive winding may be longer than the base section.

At least one of the first and second magnetic core pieces may be configured to receive a portion of the first and second legs of the inverted U-shaped conductive winding. The first magnetic core piece may include a pair of second gaps. The pair of second gaps may extend parallel to the first and second legs of the inverted U-shaped conductive winding.

The first magnetic core piece may alternatively include a single second gap. The single second gap may extend perpendicular to the base section of the winding.

The base section of the inverted U-shaped conductive winding may have a first width dimension, with the first and second legs of the inverted U-shaped conductive winding have a second width dimension greater than the first width dimension.

The inverted U-shaped conductive winding may include first and second surface mount termination pads extending from the respective first and second legs. The first and second surface mount termination pads may extend in opposite directions from one another.

The first magnetic core piece may include a first end and a second end, with the base section of the inverted U-shaped conductive winding extending from the first end to the second end, and with the second gap extending from the first end to the second end.

Each of the first magnetic core piece and the second magnetic core piece may include first and second slots for receiving the first and second legs of the inverted U-shaped conductive winding. The first magnetic core piece may include first and second physical gaps that do not communicate with the first gap. The first and second gaps may extend parallel to the first and second slots. The first and second gaps may extend on different side walls of the first magnetic core piece.

The first magnetic core piece may include a bottom wall and a first and second end wall on opposing side of the bottom wall, wherein the second gap opens to the bottom wall and extends from the first end wall to the second end wall.

The first magnetic core piece may include a top wall and a first and second end wall on opposing side of the top wall, wherein the second gap opens to the top wall and extends from the first end wall to the second end wall.

The first magnetic core piece may include a top wall and a bottom wall, and wherein the second gap extends incompletely between the top wall and the bottom wall.

The first magnetic core piece may include includes opposing end walls and a top wall, each of the opposing end walls and the top wall defining a recess, the recess in the top wall having a different width than the recess in the opposing end walls.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electromagnetic component assembly comprising:

a magnetic core assembled from a first magnetic core piece and a second magnetic core piece extending in spaced relation from the first magnetic core piece to define a first gap located between the first magnetic core piece and the second magnetic core piece; and an inverted U-shaped conductive winding including a base section and first and second legs extending from the base section;

wherein at least one of the first and second magnetic core pieces is configured to receive at least a portion of the inverted U-shaped conductive winding, and the inverted U-shaped winding being operable to generate at least one magnetic flux line inside the magnetic core;

wherein one of the first and second magnetic core pieces further includes at least one second gap extending an entire distance parallel to a circuit board between opposing side walls of the one of the first and second magnetic core pieces, wherein the second gap that is not located between the first core piece and the second magnetic core piece; and wherein the at least one second gap intersects the at least one magnetic flux line inside the magnetic core at a location separate from the first gap and allows the component to be operated at more than one stable open circuit inductance (OCL) corresponding to different current loads.

2. The electromagnetic component assembly of claim 1, wherein the first magnetic core piece extending on top of the second magnetic core piece spaced apart from the circuit board.

3. The electromagnetic component assembly of claim 1, wherein the inverted U-shaped conductive winding is arranged partly between the first and second magnetic core pieces.

4. The electromagnetic component assembly of claim 1, wherein the first and second legs of the inverted U-shaped conductive winding are shorter than the base section.

5. The electromagnetic component assembly of claim 1, wherein at least one of the first and second magnetic core pieces is configured to receive a portion of the base section of the inverted U-shaped conductive winding, and wherein respective magnetic flux lines are generated about the base section inside the magnetic core.

6. The electromagnetic component assembly of claim 5, wherein the at least one second gap intersecting at least one of the respective magnetic flux lines generated about the base section inside the magnetic core.

7. The electromagnetic component assembly of claim 1, wherein the first magnetic core piece includes a bottom wall and first and second end walls on opposing sides of the bottom wall, and wherein the second gap opens to the bottom wall and extends from the first end wall to the second end wall.

8. The electromagnetic component assembly of claim 1, wherein the second magnetic core piece includes a bottom wall and first and second end walls on opposing sides of the bottom wall, and wherein the second gap opens to the bottom wall and extends from the first end wall to the second end wall.

9. The electromagnetic component assembly of claim 1, wherein the first magnetic core piece includes a top wall and a first and second end wall on opposing side of the top wall, and wherein the second gap opens to the top wall and extends from the first end wall to the second end wall.

10. The electromagnetic component assembly of claim 1, wherein the second magnetic core piece includes a top wall and a first and second end wall on opposing side of the top wall, and wherein the second gap opens to the top wall and extends from the first end wall to the second end wall.

11. The electromagnetic component assembly of claim 1, wherein the first magnetic core piece includes a top wall and a bottom wall, and wherein the second gap extends incompletely between the top wall and the bottom wall.

12. The electromagnetic component assembly of claim 1, wherein the second magnetic core piece includes a top wall and a bottom wall, and wherein the second gap extends incompletely between the top wall and the bottom wall.

13. The electromagnetic component assembly of claim 1, wherein the second magnetic core piece includes opposing end walls and a top wall, each of the opposing end walls and the top wall defining a recess, the recess in the top wall having a different width than the recess in the opposing end walls.

14. The electromagnetic component assembly of claim 1, wherein the base section of the inverted U-shaped conductive winding has a first width dimension, and wherein the first and second legs of the inverted U-shaped conductive winding have a second width dimension greater than the first width dimension.

15. The electromagnetic component assembly of claim 1, wherein the inverted U-shaped conductive winding further comprises first and second surface mount termination pads extending from the respective first and second legs.

16. The electromagnetic component assembly of claim 15, wherein the first and second surface mount termination pads extend in opposite directions from one another.

17. The electromagnetic component assembly of claim 1, wherein the first magnetic core piece has a first end and a second end, the base section of the inverted U-shaped conductive winding extending from the first end to the second end, and the second gap extending from the first end to the second end.

* * * * *